Aug. 4, 1953 — S. A. PAOLI — 2,647,681
SEASONING DISPENSER
Filed April 20, 1949
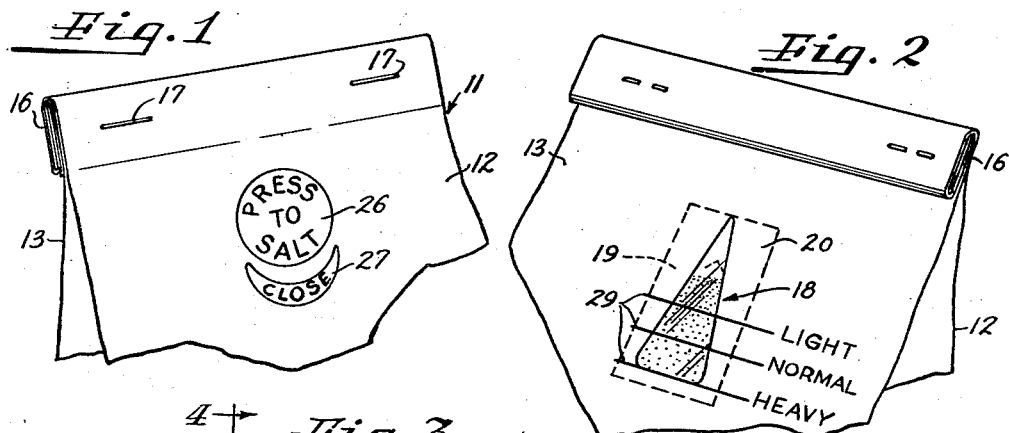
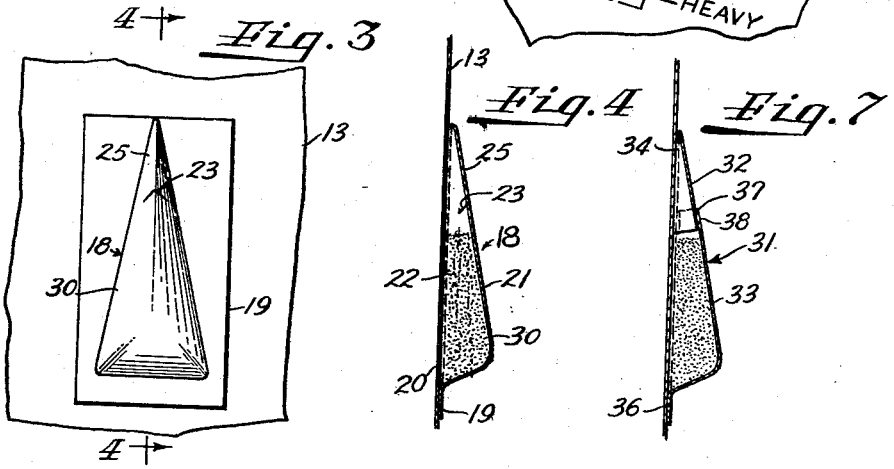
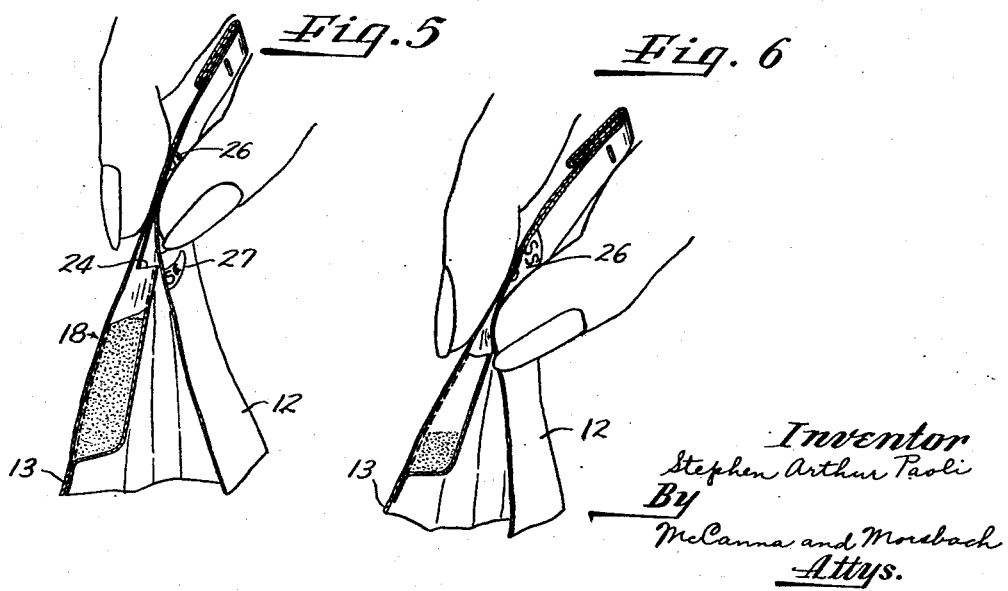
Inventor
Stephen Arthur Paoli
By McCanna and Morsbach
Attys.

Patented Aug. 4, 1953

2,647,681

UNITED STATES PATENT OFFICE 2,647,681

SEASONING DISPENSER

Stephen Arthur Paoli, Rockford, Ill.

Application April 20, 1949, Serial No. 88,611

4 Claims. (Cl. 229—56)

This invention relates to packages for bulk foods and the like requiring seasoning, and more particularly to bags for potato chips, popcorn and the like.

Heretofore, in the preparation of such foods it has been the practice of the manufacturers to season such foodstuffs during the course of manufacture. This method of seasoning foodstuffs has not been satisfactory in all respects. One difficulty with seasoning foodstuffs in the course of manufacture is that the seasoning is uniformly applied to the foodstuffs in each bag. This does not take into account that different people like different amounts of seasoning on their food. It has been found in many foods requiring seasoning, such as salt on potato chips and popcorn, that many purchasers are not satisfied with the quantity of salt normally placed on these foods by the manufacturer. Some people, for example, find these foods more palatable when they add salt to the foods in addition to that normally supplied by the manufacturer. The fact that salt must be added to an already salted item irritates many of these people. Others find that the manufacturer places too much salt on these foods. For the latter group there is no recourse but to refrain from purchasing such foodstuffs for it is extremely difficult, if not impossible, to remove the salt from these foods.

Accordingly, an object of the invention is the provision of a bag for foodstuffs of the above character having novel means for containing condiments and the like for seasoning foods whereby the purchaser of the food can season the food as desired to suit his own individual desires.

Another object of the invention is the provision of a bag of the above character having novel means for indicating the quantity of condiments used.

Another object of the invention is the provision of a bag of the above character that is readily adaptable to all types of foods normally packaged for sale, that is simple to construct and that is relatively inexpensive to produce.

Another object of the invention is to provide a bag for foodstuffs with a condiment capsule defined in part by a wall portion, formed from material capable of being manually deformed, with means defining two portions on the capsule so that one of the portion is crushable to define an opening for passage of the condiment from the capsule and the other is crushable to close the opening to prevent the passage of the condiment from the capsule.

Another object of the invention is the provision of a bag of the above character with a condiment dispenser having means on the exterior of the bag for indicating the positions on the bag that should be grasped in order to effect the deformation of the capsule as defined above.

Other objects and advantages of the invention will become apparent from the following detailed description taken in connection with the accompanying drawings, in which—

Figure 1 is a fragmentary perspective view of one side of a food bag embodying the present invention;

Fig. 2 is a fragmentary perspective view of an opposite side of the bag shown in Figure 1;

Fig. 3 is an enlarged fragmentary plan view of a side of a bag having a condiment capsule mounted thereon and showing the details of construction;

Fig. 4 is a sectional view taken substantially along the line 4—4 of Fig. 3;

Fig. 5 is a fragmentary perspective view of a bag showing the upper portion of the condiment capsule in a deformed position to define an opening for the passage of the contents from the capsule;

Fig. 6 is a view similar to Fig. 5 showing the lower portion of the capsule adjacent the opening being deformed to close the capsule, and Fig. 7 is a sectional view of a modification of the condiment capsule.

Referring now to the drawings, the invention is shown embodied in a bag for bulk foodstuffs requiring seasoning such as potato chips, popcorn and the like. In general the bag is formed from transparent paper, wax paper, plastic or the like materials and comprises a front side 12, and a back side 13 interconnected at their side edges and bottoms. The top of the bag is shaped to define a mouth portion for receiving foodstuffs and is capable of being folded as shown in Figs. 1 and 2 to form a sealed bag. The folds 16 may be either clipped together by clips 17 as shown or held in sealed relation by some other conventional means.

One aspect of the invention is concerned with storage means associated with the bag 11 for storing seasoning and the like, such as salt or other condiment, that is capable of withstanding mechanical damage and the like encountered in the normal handling of the bag so as to prevent accidental loss of the seasoning from the storage means and yet which may be readily opened from the exterior of the bag so that the seasoning may be distributed from the storage means onto the contents of the bag. As best seen in Fig. 3 the means shown herein is in the form of a condiment dispenser or capsule 18 mounted on the interior of the bag 11. In this instance the capsule is formed by the side 13 of the bag and a pad 19 having a portion 21 that projects outwardly from one side of the plane of the pad to define a recess or pocket 22. The pad 19 is secured to the side 13 of the bag 11 by any suitable means such as disposing wax between the pad 19 and the side 13 and utilizing a heat sealing process or the like. The portion 21 on the pad extends inwardly of the bag so that the walls defining the pocket 22 together with the portion 20 of the side 13 adjacent the pocket of the bag form the capsule 18 for containing the seasoning. Preferably the pad 19 is formed from thin metal foil such as aluminum foil or the like, capable of maintaining a preformed shape while yet being manually deformable. As shown in Figs. 3 and 4 the wall portion defining the pocket 22 is provided with a slit 23 adjacent one end of the capsule 18. The purpose of the slit is to divide the capsule into two portions 25 and 30, one of which may be crushed or deformed to define an opening 24 in the capsule 18 through which the seasoning in the chamber or pocket 22 may pass and the other of which may be crushed adjacent the slit 23 to close the opening 24 after a desired amount of seasoning has been removed from the capsule. In the present instance the capsule 18 is located adjacent the top of the bag.

Means is provided on the exterior of the bag for indicating the position on the bag at which pressure should be applied to effect the above described crushing or deformation of the capsule. In the present instance the means includes a circular dot 26 printed on the exterior surface of the side 12 of the bag. The dot 26 is positioned on the side 12 so that when the sides 12 and 13 of the bag 11 are squeezed together by a force applied between the dot 26 and a corresponding position on the side 13, the force is applied on the capsule 18 at a point on the wall portion just above the slit 23. Spaced immediately below the dot 26 is a crescent shaped figure 27 printed on the side 12. The crescent shaped figure 27 is positioned on the side 12 so that when the sides 12 and 13 of the bag 11 are squeezed together by a force applied between the crescent shaped figure 27 and a corresponding position on the side 13, the force is applied to the capsule 18 at a point on the wall portion just below the slit 23. Preferably descriptive captions are printed on the sides of the bag adjacent the dot 26 and the figure 27 or superimposed on these figures, as shown, to indicate that these figures are the points at which pressure should be applied to open and close the capsule 18. Where desired the dot 26 or the figure 27 may be placed on both sides of the bag. It is to be understood that either the dot 26 or the figure 27 may be replaced by a suitable corrugated surface, a raised portion on the side of the bag or the like to indicate the positions on the bag at which a squeezing pressure should be applied to crush the capsule 18.

The quantity of salt or other seasoning in the capsule 18 may be observed through the portion 20 of the side of the bag which is formed of transparent material. Where desired the relative amount of seasoning on the food in the bag 11 in terms of seasoning distributed or sprinkled on the food from the capsule 18 may be indicated on the bag. To this end lines 29 are printed on the portion 20 of the side 13 of the bag that forms a base or wall portion for the capsule 18. The lines 29 are spaced apart and each is captioned with desired indicia. As shown in Fig. 2 the lines 29 are marked "Light," "Normal," and "Heavy." The lines are correlated so that when the seasoning level in the capsule 18 is in registry with the line captioned "Light," the contents of the bag 11 should have a light sprinkling of seasoning on them. When the seasoning level in the capsule 18 is in registry with the line marked "Heavy" the capsule is empty and in this case the descriptive caption "Heavy" means that the contents of the bag should be well covered with seasoning. It is to be understood that line depressions may be formed in the bag in lieu of printing lines thereon if desired.

In Fig. 7 there is shown a modified form of the invention. In this instance the seasoning capsule 31 is formed by two pads, an upper pad 34 and a lower pad 36 secured to the side 35 of the bag by any suitable means. The pads 34 and 36 are formed with recessed portions or pockets 32 and 33 in a manner similar to that described for the embodiment of the invention shown in Figs. 1-6. The portions 32 and 33 are dimensioned so that when the ends of the pads 34 and 36 overlap as shown in Fig. 7, the lower edge 37 of the upper portion 32 is disposed in the opening of the lower portion 33 so that the upper edge 38 of the lower portion 33 overlaps the lower edge 37 of the upper portion 32. The pads 34 and 36 may be formed of metal foil or similar manually deformable material capable of maintaining a preformed shape. With this construction the upper portion 32 may be crushed to define an opening for passage of seasoning from the capsule 31 and lower portion 33 may be crushed to close the opening to prevent the passage of seasoning from the capsule as described for the embodiment shown in Figs. 1-6.

The manner in which seasoning may be dispensed from the capsule to the contents of the bag 11 is readily apparent but may be summarized briefly as follows: The user grips the bag 11 between the thumb and finger as shown in Fig. 5 so that the thumb rests on the dot 26 and the forefinger engages a corresponding position on the opposite side 13 of the bag. A squeezing pressure is applied between the thumb and forefinger. As a result the upper portion of the capsule as shown in Fig. 5 is crushed. The crushing of the upper portion moves the metal foil defining the upper portion adjacent the side 13 of the bag 11 and thereby forming the opening 24 in the bag 11. The user of the bag then shakes the bag up and down or turns the bag upside down to permit seasoning to run out of the capsule 18 and then shakes the bag to distribute or sprinkle the seasoning on the food in the bag. Thus, in effect the capsule forms a seasoning shaker in the bag 11. When the user believes the food is seasoned to suit his taste, which may be determined by opening the bag and tasting some of the contents or by observing the seasoning level and the indicating lines 29 on the bag, he closes the opening 24 by gripping the bag as shown in Fig. 6 so that the thumb is on the crescent figure 27 and the forefinger at at a corresponding position on the opposite side of the bag and applying a squeezing pressure to the sides of the bag to crush the walls adjacent the opening 24.

While I have shown the capsule herein as being defined by a portion of the side of the bag, it is to be understood that the capsule may be formed as an independent unit that may be secured to the side of a bag by convenient heat sealing means or the like. The entire capsule may be formed of foil. In the latter case, of course, the capsule would not have provision for observing the level of seasoning in the capsule. The capsule may have any desired shape and cross section and the particular pyramidal shape shown herein is for purposes of illustration only.

I claim:

1. In combination, a bag including sides and having a chamber for receiving food materials, a pad of thin flexible metal foil having a portion deformed out of the plane of the pad to define a pocket, means for securing said pad to the side of the bag to have the walls defining said pocket defining with one of the sides of the bag a capsule for containing salt and the like materials, said walls defining said pocket having a slit intermediate the ends of the capsule to define opposite end portions on the capsule, one of said end portions being deformable through the sides of the bag to define an opening in the capsule in communication with the interior of the bag for the passage of salt.

2. In combination, a bag including sides and having a chamber for receiving food materials, a pad of thin flexible metal foil having a portion deformed out of the plane of the pad to define a pocket, means for securing said pad to the side of the bag to have the walls defining said pocket defining with one of the sides of the bag a capsule for containing salt and the like materials, said walls defining said pocket having a slit intermediate the ends of the capsule to define opposite end portions on the capsule, one of said end portions being deformable through the sides of the bag to define an opening in the capsule in communication with the interior of the bag for the passage of salt, the other of said end portions being deformable through the sides of the bag to close said opening in the capsule.

3. In combination, a bag including sides and a chamber for receiving foodstuff, a first pad of flexible material mounted on the inner face of one side of the bag having a wall portion deformed out of the plane of the pad to define a pocket, a second pad of flexible material mounted on said inner face of said side of the bag having a wall portion deformed out of the plane of the pad to define a second pocket portion, and means for securing said pad to said side of the bag and in overlapping relation to have the walls defining said first and second pockets defining with said side of the bag a capsule for containing seasoning material, said deformed wall portion of one of said pads being manually deformable to be displaced toward said side of the bag independent of said deformed wall portion of the other pad to provide an opening between the overlapping portions of the pads communicating with the interior of the bag, said wall portion of the other of said pads being manually deformable to be displaced toward said side of the bag to close said opening between the pads.

4. In combination, a bag for receiving foodstuffs and a pad means mounted on an inner side of the bag defining with said side of the bag a capsule for seasoning material, said capsule being defined by separable end sections communicating with one another, a first one of said end sections being formed with a manually deformable wall portion of thin flexible material spaced from said side of the bag, the other of said end sections being formed with a manually deformable wall portion of thin flexible material spaced from said side of the bag for defining a pocket for containing seasoning material, said wall portion on said first end section of the capsule being manually deformable to be displaced toward said side of the bag independent of said wall portion on the other end section of the capsule to provide an opening between the end sections of the capsule effecting communication between said other end section and the interior of the bag for the passage of seasoning material from said other end section of the capsule into the bag, said wall portion on said other end section of the capsule being manually deformable to be displaced toward said side of the bag to close said opening between the capsule end sections.

STEPHEN ARTHUR PAOLI.

References Cited in the file of this patent

UNITED STATES PATENTS

| Number | Name | Date |
|---|---|---|
| 1,332,985 | Jarrett | Mar. 9, 1920 |
| 1,889,882 | Woods | Dec. 6, 1932 |
| 1,983,685 | Townsley | Dec. 11, 1934 |
| 2,211,498 | Files | Aug. 13, 1940 |
| 2,469,204 | Peters | May 3, 1949 |
| 2,499,313 | Hoag | Feb. 28, 1950 |